(12) United States Patent
Beuten et al.

(10) Patent No.: US 7,712,084 B2
(45) Date of Patent: May 4, 2010

(54) METHOD FOR MONITORING A PROGRAM EXECUTION USING A DEBUG LOGIC

(75) Inventors: Michael Beuten, Schwieberdingen (DE); Martin Thomas, Kraichtal (DE); Klaus Schneider, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 821 days.

(21) Appl. No.: 09/910,206

(22) Filed: Jul. 20, 2001

(65) Prior Publication Data

US 2002/0073400 A1 Jun. 13, 2002

(30) Foreign Application Priority Data

Jul. 26, 2000 (DE) ................. 100 36 278

(51) Int. Cl.
*G06F 9/44* (2006.01)
*G06F 11/00* (2006.01)

(52) U.S. Cl. .............. 717/129; 717/126; 717/128; 714/38

(58) Field of Classification Search ......... 717/124–129, 717/131; 714/55, 10, 30–39; 701/115; 365/201
See application file for complete search history.

(56) References Cited

U.S. PATENT DOCUMENTS

| 5,155,809 | A | * | 10/1992 | Baker et al. ................. 709/227 |
| 5,450,586 | A | * | 9/1995 | Kuzara et al. ............... 717/124 |
| 5,630,045 | A | * | 5/1997 | Krygowski et al. ........... 714/10 |
| 5,657,442 | A | * | 8/1997 | Groves ........................ 714/28 |
| 5,680,620 | A | * | 10/1997 | Ross .......................... 717/129 |
| 5,770,836 | A | * | 6/1998 | Weiss ......................... 219/481 |
| 5,805,800 | A | * | 9/1998 | Kotani et al. ................ 726/27 |
| 5,809,293 | A | * | 9/1998 | Bridges et al. .............. 712/227 |

(Continued)

FOREIGN PATENT DOCUMENTS

JP 05173890 A * 7/1993

(Continued)

OTHER PUBLICATIONS

Daniel Mann, Lowering the cost of software tracing, Electronic Engineering Times, Feb. 5, 1996. p. 72.*

(Continued)

*Primary Examiner*—Wei Y Zhen
*Assistant Examiner*—Ryan D Coyer
(74) *Attorney, Agent, or Firm*—Kenyon & Kenyon LLP

(57) ABSTRACT

A method for monitoring the execution of a program executable on at least one microprocessor of a micro controller using a debug logic of the micro controller, with an exception, particularly an interrupt of the program execution, being triggered by the debug logic upon access to a specific address range during the program execution time. In order to provide monitoring of the execution of a program, executable on a microprocessor, for faults, which is particularly reliable yet conserves resources as much as possible, it is suggested that the debug logic be configured by the microprocessor and that an exception routine be executed by the debug logic after an exception has been triggered during the program execution time. The debug logic is advantageously configured during the startup of the micro controller. Preferably, the micro controller is reset and started up again and the monitored program is initialized during the execution of the exception routine.

9 Claims, 3 Drawing Sheets

U.S. PATENT DOCUMENTS

| | | | | |
|---|---|---|---|---|
| 5,943,498 A | * | 8/1999 | Yano et al. | 717/128 |
| 5,983,017 A | * | 11/1999 | Kemp et al. | 717/129 |
| 6,145,123 A | * | 11/2000 | Torrey et al. | 717/128 |
| 6,282,701 B1 | * | 8/2001 | Wygodny et al. | 717/125 |
| 6,397,349 B2 | * | 5/2002 | Higgins et al. | 714/7 |
| 6,412,071 B1 | * | 6/2002 | Hollander et al. | 713/200 |
| 6,463,553 B1 | * | 10/2002 | Edwards | 714/38 |
| 6,502,209 B1 | * | 12/2002 | Bengtsson et al. | 714/35 |
| 6,535,811 B1 | * | 3/2003 | Rowland et al. | 701/115 |
| 6,560,722 B1 | * | 5/2003 | Frankel et al. | 714/38 |
| 6,634,020 B1 | * | 10/2003 | Bates et al. | 717/131 |
| 6,658,653 B1 | * | 12/2003 | Bates et al. | 717/131 |
| 6,667,917 B1 | * | 12/2003 | Templeton et al. | 365/201 |
| 6,681,384 B1 | * | 1/2004 | Bates et al. | 717/129 |
| 6,697,972 B1 | * | 2/2004 | Oshima et al. | 714/55 |
| 2003/0033592 A1 | * | 2/2003 | Tsubata et al. | 717/128 |

FOREIGN PATENT DOCUMENTS

JP        10078919 A    *    3/1998

OTHER PUBLICATIONS

Warren Webb, Squash your embedded debugging time, EDN, Oct. 14, 1999. vol. 44, Iss. 21; p. 113 (6 pages).*

Nat Hillary, Interactive trace exposes bugs faster, Electronic Engineering Times, Manhasset: Mar. 27, 2000. p. 110 (2 pages).*

* cited by examiner

US 7,712,084 B2

METHOD FOR MONITORING A PROGRAM EXECUTION USING A DEBUG LOGIC

FIELD OF THE INVENTION

The present invention relates to a method for monitoring the execution of a program, executable on at least one microprocessor of a micro controller, using a debug logic of the micro controller, with an exception, particularly an interrupt of the program execution, being triggered by the debug logic upon access to a specific address range during the program execution.

The present invention further relates to a control element, particularly a read-only memory or a flash memory, for a micro controller, particularly a controller of a motor vehicle, with a program stored on the control element which is executable on at least one microprocessor of the micro controller and which is capable of causing a debug logic of the micro controller, during startup of the micro controller, to monitor the execution of a further program executable on the at least one microprocessor of the micro controller during the program execution time, to trigger an exception, particularly an interrupt, of the program execution upon access to a specific address range, and then to execute an exception routine.

Finally, the present invention concerns a micro controller having at least one microprocessor and a debug logic, with a program being executable on the at least one microprocessor, and the debug logic monitoring the execution of the program during the program execution time and triggering an exception, particularly an interrupt of the program execution, upon access to a specific address range.

BACKGROUND INFORMATION

Micro controllers are known from the related art which have at least one microprocessor (computer core), an analog/digital (A/D) converter, a digital/analog (D/A) converter, a data bus, an address bus, a control bus, internal control elements (e.g., a read-only memory or a flash memory), and/or further components. This type of micro controller is, for example, part of a controller for a motor vehicle. The controller is used for control/regulation of technical processes in the motor vehicle of, e.g., the internal combustion engine, the transmission, the steering assembly, the chassis, etc. A control program for executing the control/regulation is stored in an internal or external control element of the micro controller. The control program is executable on at least one of the microprocessors.

More complex Micro controllers of a newer design have a debug logic as a further component. The debug logic is used during the development of the program that is executable on the at least one microprocessor of the micro controller and is used for improvement of the visibility of the processes running in the micro controller. With the aid of the debug logic, faults in the program can be recognized, localized, and removed from the program. The debug logic is connected to a data bus, an address bus, and/or a control bus of the micro controller. The debug logic can learn from the address bus which selected address range was accessed, from the data bus, which data is to be written into the selected address range or was read out of the selected address range, and, from the control bus, whether a write or read access is to be performed on the selected address range.

The debug logic additionally has a debug interface which can be connected to a debugger. The debugger is usually implemented as a conventional personal computer (PC) on which a debug program runs. With the aid of the debugger, the program execution on the microprocessor can be controlled and the status of the program and of the micro controller can be monitored. After completion of the program development, the debug logic is no longer necessary. However, because it is part of the micro controller, it is unavoidably taken along during the program execution time during the designated use of the micro controller, although it actually has no function.

The debug logic is connected to the microprocessor via an event line. The debug logic can, as a rule, trigger an exception, e.g., an interrupt. An interrupt is a signal which is sent from an input/output unit to the microprocessor when a fault has occurred or an intervention is required in order to terminate the input/output. An interrupt normally causes the execution of the current program to be discontinued and an interrupt routine to be executed.

Using a trace tool, which tracks and records the processes running in a micro controller, particularly in the microprocessor, during the development of a program executable on the microprocessor of a micro controller, is known from U.S. Pat. No. 5,809,293. However, making the processes visible with the trace tool reaches its limits, if, for example, a cache is positioned, between the trace tool and the microprocessor, in which values are temporarily stored during the program execution time and read out as needed. In this case, because the trace tool does not have access directly to the microprocessor, but only to the temporarily stored values, it does not know which commands are executed by the microprocessor and when. U.S. Pat. No. 5,809,293 suggests that, in such a case, a debug logic be used to support the trace tool and to enhance the visibility of the processes running in the micro controller.

A micro controller having a debug logic is known from U.S. Pat. No. 5,680,620 which is used to execute a reaping of input/output (I/O) ports. This can be necessary, for example, if an old program runs in a new hardware environment in which specific I/O ports are no longer present. A breakpoint is placed at the addresses of the I/O ports which are no longer present. The debug logic monitors the program execution during the program execution time. When access to one of these addresses is attempted, an exception is triggered and an exception routine is executed. In the course of the exception routine, the address of the I/O port no longer present is reaped onto the address of an I/O port present in the new hardware environment.

This method from U.S. Pat. No. 5,680,620 can also be used to allow execution of an old program in a new operating system environment. For example, if, unlike the old operating system, the new operating system allows access to an I/O port from multiple applications, the accesses to the I/O port cannot take place directly from an application—as was typical under the old operating system environment—but is controlled and coordinated via the operating system. In this case, each access to an I/O port triggers an exception, through which the access is routed to the operating system for coordination.

In the methods known from the related art, only legal accesses to the I/O ports are handled. In the framework of the known methods, the commands and/or the program are not monitored for possible faults. The known method therefore simply involves an expansion of the operating system.

Monitoring a stack of a micro controller by writing a pattern in a storage area at the edge of the stack during the startup of the micro controller and checking whether or not this pattern has been changed from time to time during the program execution time is also known from the related art. A change in the pattern indicates a stack overflow or a stack underflow. This type of monitoring of a storage area has the disadvantage, however, that it is relatively resource-intensive;

in particular, it costs microprocessor computing performance and program memory. In addition, it is no longer sufficient for stack monitoring in modern Micro controllers to monitor a change in a pattern in a limited storage area at the edge of the stack, because, during the building of a stack frame, a jump over several addresses can also occur without the addresses in the intermediate space being altered. For this reason, the storage area at the edge of the stack to be monitored is selected to be ever larger, whereby the resources of the micro controller are greatly strained and the computing time increases. In addition, the known method does not recognize a stack overflow and/or a stack underflow until storage areas outside the storage area provided have already been accessed. The danger thereby arises that the program executable on the microprocessor will reach an undefined state even before the overflow or underflow of the stack area provided is detected and appropriate countermeasures can be introduced.

SUMMARY OF THE INVENTION

An object of the present invention is to create monitoring of the execution of a program executable on a microprocessor for faults, which is particularly reliable, yet conserves resources as much as possible.

To achieve the object, the present invention suggests that the debug logic be configured by the microprocessor and that an exception routine be executed by the debug logic after an exception is triggered during the program execution time.

According to the present invention, a debug logic, which as a rule does not have a function during the program execution time, is used for monitoring the program for faults. The faults to be detected by the debug logic can be of various types. In particular, the monitoring of specific storage areas in order to prevent illegal access to the storage areas is considered. It is conceivable that the program, due to programming errors or hardware faults, will attempt to access storage areas which are physically not present or which lie outside a storage area provided. This type of illegal access can get the program into an undefined state and can result in unpredictable actions by the controller.

The use of the debug logic for fault analysis of a program during the program execution time has the advantage that the debug logic allows reliable monitoring of the program execution. In addition, this is a particularly resource-conserving monitoring of the program execution, because the debug logic affects neither the computing performance of the microprocessor nor the program memory.

With the method according to the present invention, the reliability of a micro controller can be enhanced in various ways. First, a higher computing load of the microprocessor is possible. In addition, reliable functioning of the fault analysis is provided independently of the computing load of the microprocessor. Finally, the implementation of the fault analysis is independent from the storage design used. For example, in a stack it is unimportant how a stack frame is created. Even a jump over several storage addresses during the construction of the stack frame does not result in loss of monitoring reliability.

According to an advantageous refinement of the present invention, it is suggested that the debug logic be configured during the startup of the micro controller.

According to a preferred embodiment of the present invention, it is suggested that, during the execution of the exception routine, the micro controller be reset and started up again and the program monitored be initialized.

In order to prevent the program from reaching an undefined state due to the fault which has occurred and the controller from executing unpredictable actions, after the exception is triggered, the micro controller is reset for reasons of safety and started up again and the program is initialized. After the startup of the micro controller and initialization of the program, they are in a defined initial state.

According to another preferred embodiment of the present invention, it is suggested that at least the type of fault be stored in a fault memory before the micro controller is reset and started up again and before the program is initialized. The contents of the fault memory can be read out and analyzed from time to time, e.g., when the motor vehicle is in a repair shop. Important information about the reliability of the program, and thereby also about the reliability of the controller, can be learned from the fault memory. The memory addresses which were accessed before the fault occurred are also advantageously stored in the fault memory before resetting and starting up the micro controller again and before initializing the program.

According to an advantageous refinement of the present invention, it is suggested that the debug logic monitor whether the program accesses a preselect able memory address range during the program execution time. The debug logic is connected to an address bus, a data bus, and/or a control bus. The debug logic can learn from the address bus which address range was accessed, from the data bus, which data was written in a specific address range or read out of a specific address range, respectively, and, from the control bus, whether a write or read access to a specific address range occurred. The address range can, for example, be assigned to a specific storage area.

According to a preferred embodiment of the present invention, it is suggested that the debug logic monitor whether the program accesses an address range of the stack of the micro controller beyond a preselect able maximum stack size. Beyond the maximum stack size, an illegal storage area, known as a break region, is defined, on which a break point is set. If a stack pointer points to this illegal storage area during the program execution time, i.e., if an attempt is made to access the illegal storage area, an exception is triggered.

The stack is the only storage area whose size is not exactly defined and which can change during the program execution time. To save storage space, the maximum stack area selected is as small as possible. On the other hand, it is also selected to be sufficiently large in order to ensure, even in the worst case, that the stack pointer always points to an address within the maximum storage area. In certain operating situations of the micro controller, it can be filled to the point that the stack pointer points to the illegal storage area. These situations can be detected with the method according to the present invention in a particularly reliable and at the same time resource-conserving way.

According to an alternative refinement of the present invention, it is suggested that the debug logic monitor whether, during the program execution time, an attempt is made to bring a code sequence of the program, swapped out of a flash memory of the micro controller into a random access memory of the micro controller, into the flash memory for execution. An update of a flash memory during the program execution time is, as a rule, executed via a controller area network (CAN) bus or a diagnosis interface, because these are typically the only interfaces freely accessible from the outside in a closed controller. These interfaces are controlled by specific code sequences of a program. The update of the flash memory can therefore be executed only during the execution of these code sequences. For this reason, during the update the code sequences of the program required for control of the interfaces are transferred from the flash memory into a random access memory, where they have to be executed. If an attempt is now made during the program execution time to access the flash memory for execution of the code sequences, this indicates that a program pointer is pointing in the wrong direction. The danger arises that the program will reach an undefined state. For this reason, an exception is triggered by the debug logic if an attempt is made during the program execution time to access the flash memory for execution of the code sequences.

In the framework of the present invention, the utilization of the microprocessor of the micro controller during the program execution time can also be monitored by the debug logic. For this purpose, the beginning and end of an idle task are detected by the debug logic and logged with the aid of an additional microprocessor. The microprocessor executes an idle task when it has no other task to execute, i.e., when it is not being utilized. The frequency of execution of the idle task is thus inversely proportional to the utilization of the micro controller. The memory addresses of the idle task are known. The debug logic can monitor an access to these memory addresses and trigger an exception at the beginning and end of the idle task. The additional microprocessor can monitor the event line, via which the debug logic is connected with the microprocessor. The additional microprocessor detects the triggering of an exception and can thereby log the beginning and end of the idle task. In a micro controller with multiple microprocessors, a first processor of the micro controller can be used for execution of the program and another processor of the micro controller can be used for monitoring the utilization of the first processor.

The implementation of the method according to the present invention in the form of a control element which is provided for a micro controller, particularly a micro controller of a controller of a motor vehicle, is of particular importance. A program which is executable on at least one microprocessor of a micro controller and which is suitable for the implementation of a method according to the present invention is stored in the control element. The control element is, in particular, capable of causing a debug logic of the micro controller, during startup of the micro controller, to monitor the execution of a further program executable on the at least one microprocessor of the micro controller during the program execution time. A break point is set at a specific address range by the program, so that, upon an access to this program range, an exception is triggered, particularly an interrupt of the program execution. The program also has a special exception routine, which is executed following the exception. In the course of the exception routine, the micro controller is reset and started up again and the monitored program is initialized. The additional program to be monitored is, for example, implemented as a control program of the controller. A computer readable medium can particularly be used as the control element, e.g., a read-only memory or a flash memory.

As a further way to achieve the object of the present invention, it is suggested that the microprocessor configures the debug logic and the micro controller has an arrangement for executing an exception routine after an exception is triggered during the program execution time.

DETAILED DESCRIPTION

Figure 1:
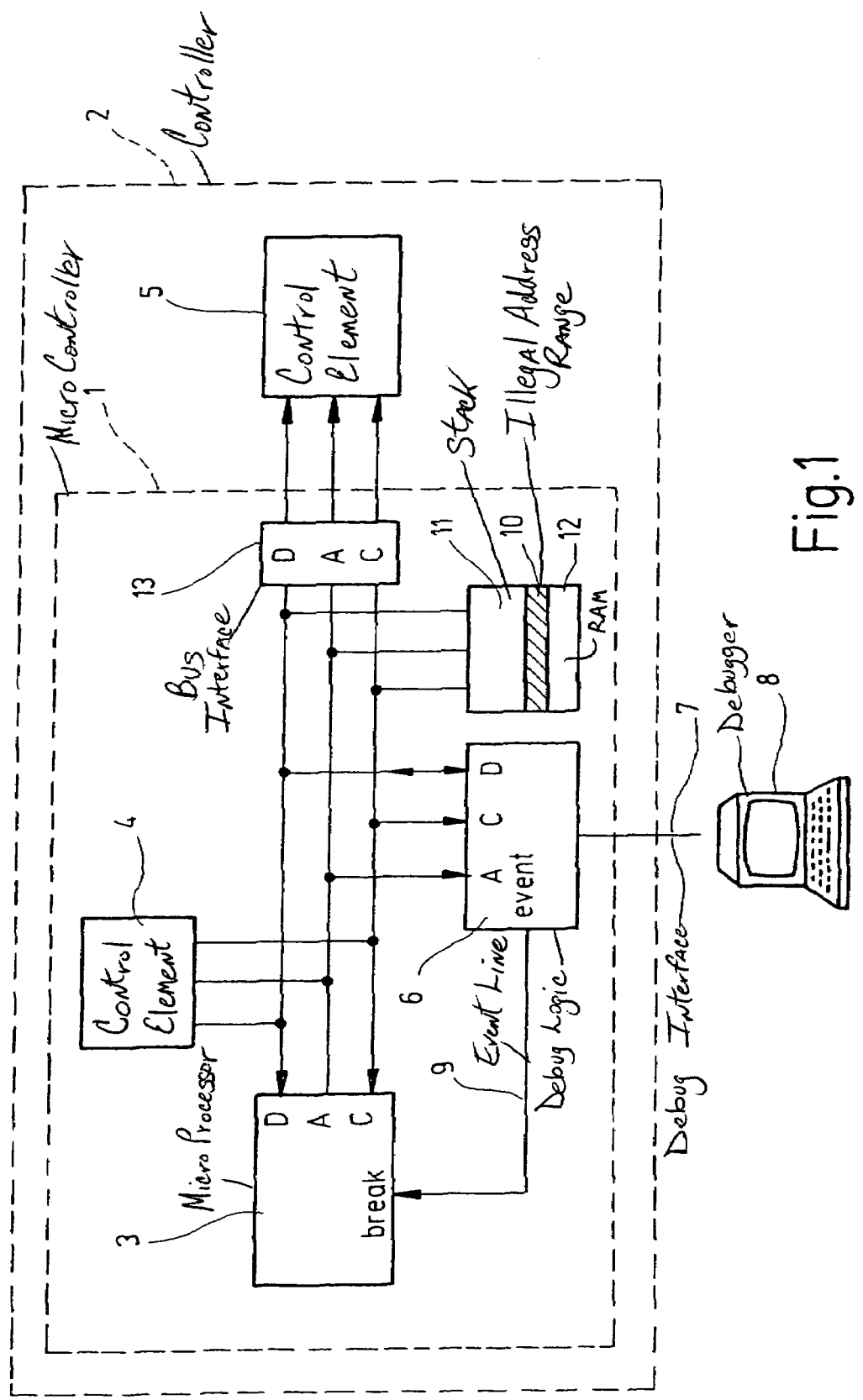
FIG. 1 shows a micro controller according to the present invention according to a first preferred embodiment of present invention.

In FIG. 1, a micro controller according to the present invention is denoted as a whole with the reference number 1. Micro controller 1 is, for example, part of a controller 2 for a motor vehicle. Controller 2 is used for the control/regulation of technical processes in the motor vehicle of, e.g., the internal combustion engine, the transmission, the steering assembly, the chassis, etc. Micro controller 1 has a microprocessor 3 on which a control program for performing the control/regulation is executable. The control program is stored in an internal control element 4 and/or in an external control element 5. Control elements 4, 5 are preferably implemented as storage elements. Internal control element 4 is implemented as a flash memory, and external control element 5 is implemented as a random access memory. External control element 5 is connected via a bus interface 13 to data bus D, address bus A, and control bus C. Bus interface 13 converts the bus signals into the standard of external control element 5.

Furthermore, micro controller 1 has a debug logic 6. Debug logic 6 is, according to the related art, used during the development of the control program executable on microprocessor 3 of micro controller 1 and is used to enhance the visibility of the executions in micro controller 1. With the aid of debug logic 6, faults in the control program can be recognized, localized, and removed from the program. Microprocessor 3, internal control element 4, external control element 5, and debug logic 6 are connected to one another via a data bus D, an address bus A, and/or a control bus C of micro controller 1.

Debug logic 6 has a debug interface 7, connected to the housing of controller 2, which is accessible from outside controller 2, and to which a debugger 8 can be connected. Debugger 8 is usually implemented as a typical personal computer (PC), on which a debug program runs. With the aid of debugger 8, the execution of the program on microprocessor 3 can be controlled and the state of the program and of micro controller 1 can be monitored.

Debug logic 6 is connected with microprocessor 3 via an event line 9. Debug logic 6 can generate an exception, for example, an interrupt, and send the exception via event line 9 to microprocessor 3. Upon the occurrence of a specific exception, an appropriate exception routine is selected from an exception table. The execution of the current program is discontinued and the exception routine is executed. An exception routine can trigger various actions, which range from resetting micro controller 1 and starting it up again and initializing the program to operating specific components (e.g., input/output units) of micro controller 1.

According to the present invention, debug logic 6 is used, during the execution time of the program executable on microprocessor 3, for monitoring the program for the occurrence of a preselect able fault. After the occurrence of the preselect able fault, an exception is triggered via event line 9 and an exception routine corresponding to the fault is executed. In the course of the exception routine, the type of fault and the storage address which was accessed before the occurrence of the fault are first stored in a fault memory (not shown). Then, micro controller 1 is reset and started up again and the monitored control program is initialized. The contents of the fault memory can be read out and analyzed from time to time, e.g., when the motor vehicle is in a repair shop.

The fault analysis according to the method according to the present invention is preferably used for monitoring a preselect able address range of a memory. The control program is particularly monitored for whether access is made to an illegal address range 10, beyond a preselectable maximum stack size of 4 Kb, of stack 11 of micro controller 1 during the program execution time. A stack 11 is an area of a random access memory (RAM) 12 of the micro controller 1. Stack 11 has a data structure in which data elements can be added to the end of a sequential list (input into stack 11) and retrieved from the same end (removed from stack 11). This type of access corresponds to the last-in/first-out (LIFO) method. In the present exemplary embodiment, RAM 12 has a size of 26 Kb and the maximum stack size is 4 Kb.

A break point is set at illegal storage area 10. Storage area 10 is referred to as a break region. As soon as a stack pointer points at illegal storage area 10, debug logic 6 triggers an exception via event line 9. The stack pointer is, for example, implemented as a predefined register whose data content corresponds to the address range of the stack 11 to which the stack pointer points. If, for example, a value is on address bus A which is within illegal storage area 10, this is registered by debug logic 6. If, in addition, a write or read command is then applied to control bus C, i.e., if an attempt is made to access illegal storage area 10, debug logic 6 triggers the exception.

Figure 2:
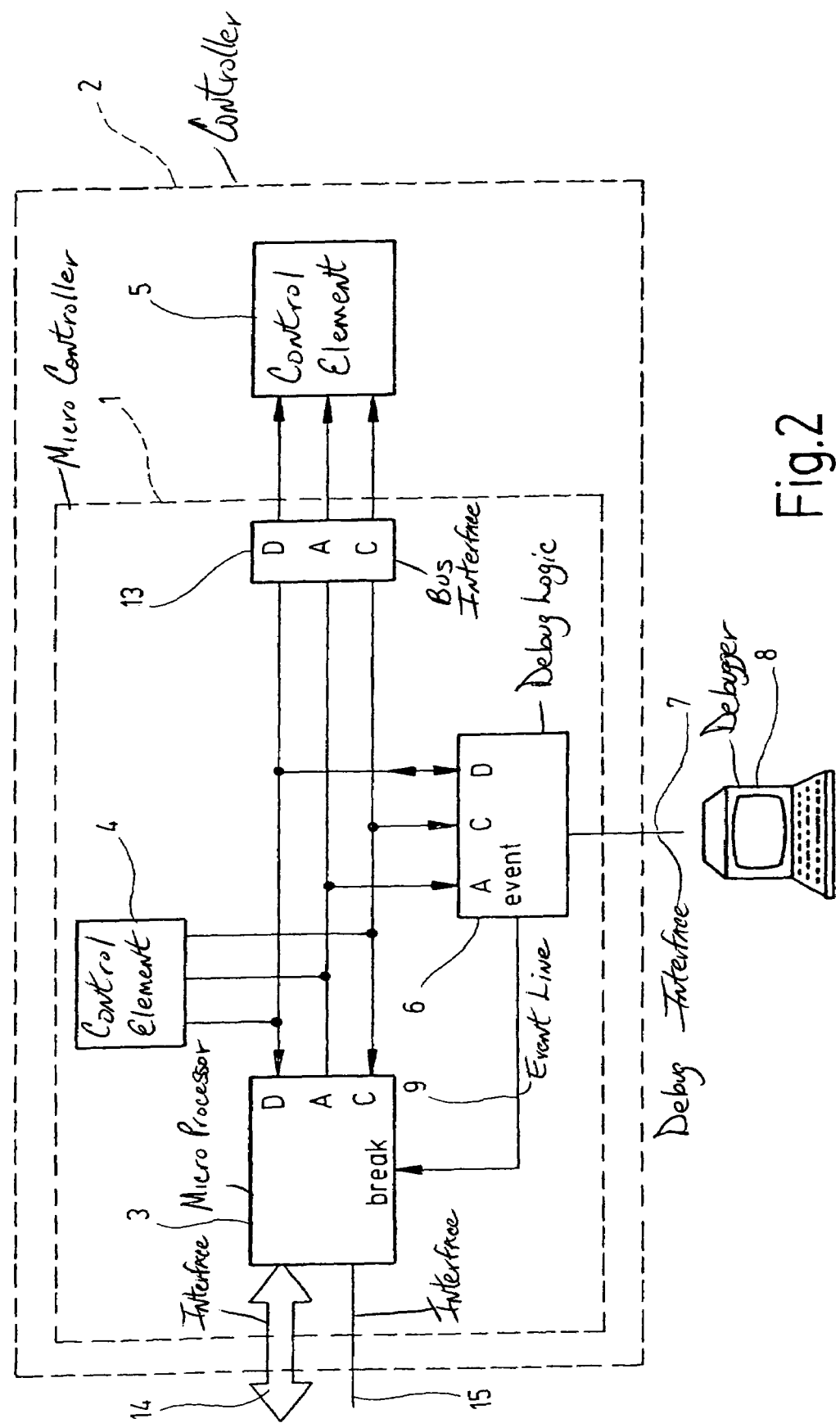
FIG. 2 shows a micro controller according to the present invention according to a second preferred embodiment of the present invention.

In FIG. 2, an alternative embodiment of the present invention is illustrated. An update during the program execution time of internal control element 4, implemented as a flash memory, is, as a rule, executed via a controller area network (CAN) bus 14 or a diagnosis interface 15, because these are typically the only interfaces freely accessible from the outside in a closed controller 2. These interfaces 14, 15 are controlled by specific code sequences of a program executable on microprocessor 3. The update of internal control element 4 can therefore only be performed during the execution of these code sequences. For this reason, during the update of internal control element 4, the code sequences of the program required for control of interfaces 14, 15 are transferred from internal control element 4 into external storage 5, implemented, for example, as a random access memory, where they have to be executed during the update.

It is conceivable that the control program may, due to programming errors or hardware faults, incorrectly attempt to access internal control element 4 during the program execution time to execute the stored code sequences. This indicates that a program pointer is pointing in the wrong direction. The danger arises that the program will reach an undefined state. In order to prevent this according to the second preferred embodiment of the present invention, debug logic 6 monitors whether an attempt is made during the execution of the control program to bring the swapped out code sequence of the control program into internal control element 4 to be executed. Debug logic 6 triggers an exception if an attempt is made during the program execution time to access internal memory 4 to execute the code sequences.

Figure 3:
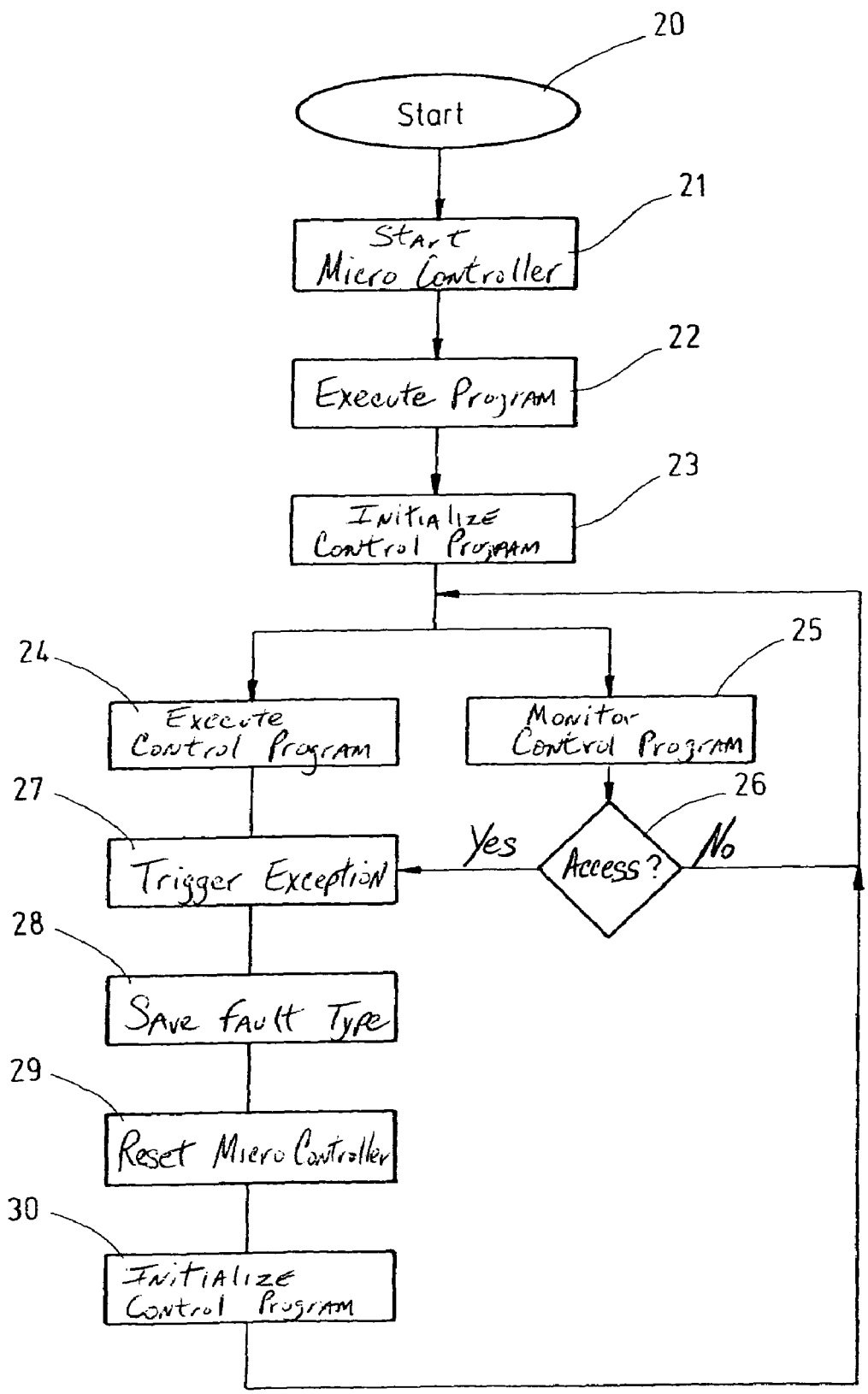
FIG. 3 shows a flow chart of the method according to the present invention.

In FIG. 3, a flow chart of the method according to the present invention for the exemplary embodiment from FIG. 1 is illustrated. The method begins in function block 20. Subsequently, micro controller 1 is started up in a function block 21. During the startup of micro controller 1, a program stored in microprocessor 3 in a control element, e.g., in internal control element 4, is executed in function block 22. Upon startup of micro controller 1 the program is capable of causing debug logic 6 to monitor the further control programs executable on microprocessor 3 of micro controller 1 during the program execution time. A break point is set at illegal address range 10 by the program during the startup, so that the exception is triggered upon an access to this address range 10. The program also has a specific exception routine which is executed after the exception is triggered.

In a subsequent function block 23, the control program to be monitored is initialized. The control program to be monitored is then executed in a function block 24, i.e., controller 2 performs its intended control/regulation function. At the same time, debug logic 6 monitors the execution of the control program in a function block 25 and performs its fault analysis function.

Monitoring of whether the control program accesses illegal address range 10 during the program execution time is performed in a query block 26. If not, then branching to function block 24 and 25 occurs again. If yes, an exception is triggered (function block 27), the execution of the control program is interrupted, and the exception routine is executed. In the course of the exception routine, the type of fault and the memory address which was accessed before occurrence of the fault are first saved in a fault memory in a function block 28. Then, in a function block 29, micro controller 1 is reset and started up again. Finally, the monitored control program is initialized in a function block 30 and then branched to function block 24 for further execution of the control program and to function block 25 for simultaneous fault analysis.

What is claimed is:

1. A computer readable medium having a program, the program performing a method for monitoring an execution of another program that is executable on at least one microprocessor of a micro controller using a debug logic of the micro controller, comprising:

causing the debug logic to trigger an exception upon access to a specific address range during a program execution time;

causing the at least one microprocessor to configure the debug logic; and causing the debug logic to execute an exception routine after the exception is triggered during the program execution time;

wherein the access to the specific address range includes access to an illegal storage area, and wherein the debug logic and its registers are operated in parallel to the program execution time to check a stack having the specific address range and an exception routine is set up in reaction to a break point event in the stack, so as to provide a secure stack check without using the program execution time of the microprocessor;

wherein the debug logic monitors a program run, wherein a memory address is stored that was accessed before an occurrence of the fault in the fault memory and at least a type of a fault is stored in a fault memory, before the micro controller is reset and started up again and before the program is initialized, wherein during the execution of the exception routine, the micro controller is reset, the micro controller is started up again, and the program is initialized, wherein the exception corresponds to an interrupt of the execution of the program, wherein the debug logic is configured during a startup of the micro controller, wherein the debug logic monitors whether the program one of (i) accesses a preselectable address range of a memory during the program execution time, and (ii) accesses an address range of a stack of the micro controller beyond a preselectable maximum stack size during the program execution time, and wherein the debug logic monitors whether an attempt is made during the program execution time to execute a code sequence of the program in a first type of memory, swapped out from the first type of memory of the micro controller into another type of memory of the microcontroller.

2. The computer readable medium according to claim 1, further comprising:
during the execution of the exception routine, resetting the micro controller, starting up the micro controller again, and initializing the program.

3. The computer readable medium according to claim 2, further comprising the step of:
storing at least a type of a fault in a fault memory before the micro controller is reset and started up again and before the program is initialized.

4. The computer readable medium according to claim 3, further comprising the step of:
storing a memory address that was accessed before an occurrence of the fault in the fault memory before the micro controller is reset and started up again and before the program is initialized.

5. A control element for a micro controller, comprising:
an arrangement for storing a program, the program being executable on at least one microprocessor to perform the following:
causing a debug logic to trigger an exception upon access to a specific address range during a program execution time,
causing the at least one microprocessor to configure the debug logic, and
causing the debug logic to execute an exception routine after the exception is triggered during the program execution time;
wherein the access to the specific address range includes-access to an illegal storage area, and
wherein the debug logic and its registers are operated in parallel to the program execution time to check a stack having the specific address range and an exception routine is set up in reaction to a break point event in the stack, so as to provide a secure stack check without using the program execution time of the microprocessor;
wherein the debug logic monitors a program run,
wherein a memory address is stored that was accessed before an occurrence of the fault in the fault memory and at least a type of a fault is stored in a fault memory, before the micro controller is reset and started up again and before the program is initialized,
wherein during the execution of the exception routine, the micro controller is reset, the micro controller is started up again, and the program is initialized,
wherein the exception corresponds to an interrupt of the execution of the program,
wherein the debug logic is configured during a startup of the micro controller,
wherein the debug logic monitors whether the program one of (i) accesses a preselectable address range of a memory during the program execution time, and (ii) accesses an address range of a stack of the micro controller beyond a preselectable maximum stack size during the program execution time, and
wherein the debug logic monitors whether an attempt is made during the program execution time to execute a code sequence of the program in a first type of memory, swapped out from the first type of memory of the micro controller into another type of memory of the microcontroller.

6. The control element according to claim 5, wherein:
the control element corresponds to one of a read-only memory and a flash memory.

7. The control element according to claim 5, wherein:
the micro controller is arranged in a motor vehicle.

8. A micro controller, comprising:
at least one microprocessor;
a debug logic, wherein:
a program is executable on the at least one microprocessor,
the debug logic monitors an execution of the program during a program execution time and triggers an exception upon access to a specific address range, and
the at least one microprocessor configures the debug logic; and
an arrangement for executing an exception routine after the exception is triggered during the program execution time;
wherein the access to the specific address range includes-access to an illegal storage area, and
wherein the debug logic and its registers are operated in parallel to the program execution time to check a stack having the specific address range and an exception routine is set up in reaction to a break point event in the stack, so as to provide a secure stack check without using the program execution time of the microprocessor;
wherein the debug logic monitors a program run,
wherein a memory address is stored that was accessed before an occurrence of the fault in the fault memory and at least a type of a fault is stored in a fault memory, before the micro controller is reset and started up again and before the program is initialized,
wherein during the execution of the exception routine, the micro controller is reset, the micro controller is started up again, and the program is initialized,
wherein the exception corresponds to an interrupt of the execution of the program,
wherein the debug logic is configured during a startup of the micro controller,
wherein the debug logic monitors whether the program one of (i) accesses a preselectable address range of a memory during the program execution time, and (ii) accesses an address range of a stack of the micro controller beyond a preselectable maximum stack size during the program execution time, and
wherein the debug logic monitors whether an attempt is made during the program execution time to execute a code sequence of the program in a first type of memory, swapped out from the first type of memory of the micro controller into another type of memory of the microcontroller.

9. The micro controller according to claim 8, wherein:
the exception corresponds to an interrupt of the execution of the program.

* * * * *